United States Patent [19]

Frank et al.

[11] Patent Number: 4,471,196
[45] Date of Patent: Sep. 11, 1984

[54] SOLID STATE RADIO FREQUENCY POWER GENERATOR

[75] Inventors: William E. Frank, Baltimore; Chuck F. Der, Sykesville, both of Md.

[73] Assignee: Westinghouse Electric Corp., Pittsburgh, Pa.

[21] Appl. No.: 278,912

[22] Filed: Jun. 29, 1981

[51] Int. Cl.³ .............................................. H05B 6/06
[52] U.S. Cl. ........................... 219/10.77; 219/10.49 R; 219/10.75; 363/98
[58] Field of Search ...................... 219/10.77, 10.49 R, 219/10.75; 323/212, 217; 363/48, 132, 133, 134

[56] References Cited

U.S. PATENT DOCUMENTS

| | | | |
|---|---|---|---|
| 3,718,852 | 2/1973 | Bailey | 219/10.77 X |
| 4,280,038 | 7/1981 | Havas et al. | 219/10.77 |
| 4,309,586 | 1/1982 | Ishibashi | 219/10.77 |
| 4,358,654 | 11/1982 | Estes | 219/10.77 |

OTHER PUBLICATIONS

"Application of Switch Mode Controlled VMOSFEPT's for Power Conversion in DC and AC Motor Drives"; Undeland, Tore Marvin; Electrical Power Engineering Dept., the Norweigian Institute of Technology; Sept. 28–Oct. 3, 1980.

"Driving the SIPMOS Field-Effect Transistor as a Fast Power Switch"; Hebenstreit, Ernst; Dept. of Engineering, Siemens, A. G.; May 23, 1980.

Primary Examiner—Roy N. Envall, Jr.
Assistant Examiner—M. M. Lateef
Attorney, Agent, or Firm—C. M. Lorin

[57] ABSTRACT

A solid state radio frequency high power generator for induction heating applications uses MOSFET devices controlled at radio frequency by a current loop which is automatically corrected against the possible occurrence of a leading phase shift by a voltage-current phase shift detection loop which responds to digital signals corrected against inherent time delays.

8 Claims, 7 Drawing Figures

SOLID STATE RADIO FREQUENCY POWER GENERATOR

BACKGROUND OF THE INVENTION

The present invention relates to induction heating in general, and more particularly to a solid state radio frequency high power generator applicable to induction heating. Static controlled converters have been used in the prior art for the generation of high frequency induction heating. In general, when going higher in frequency the outputted power becomes lower or more limited. On the other hand, static power switches have limited the increase of the frequency because they could not be turned ON and OFF fast enough. Thus, with SCR devices, even when using modern GTO gating techniques, the frequency range was of the order of 10 kHz. On the other hand, bipolar transistors have led to frequencies of the order of 100 kHz to 200 kHz but at the cost of lower power output.

It is also well known that the higher the frequency the more the induction heating process can be concentrated at the surface of the workpiece which is a most favorable capability for surface cleaning (for instance of printed circuit boards, fruit cans, etc . . . ). Therefore, there is a need for going as high as the radio frequency range, namely at frequencies of the order of 100 kHz to 500 kHz or more.

With the advent of power FET devices (known on the market as VMOS, MOSFET, HEXFET, D-MOS and more generally power FET devices), it has become possible to use devices capable of higher power and much higher switching speeds. This fact has been disclosed for instance by Brian R. Pelly in Number AN-930, pages 1 to 11 of "Power MOSFET Applications Notes" published by International Rectifier in November of 1979. Nevertheless, the unusual power and frequency levels achieved with these new devices are such that to be workable, practical, and reliable, e.g. to be an induction heating apparatus capable of the radio frequency range and of powers of the order of several kilowatts. an induction heating apparatus should satisfy rigorous requirements in its design, lay out and control scheme.

Low power high frequency generators for induction heating have been discussed by H. Lind in Brown Boveri Review No. 5-1972, pp. 236-241 under the title "New Low-Power High-Frequency Generators for Induction Heating", and high power, high frequency generators have been described by J. Getzner in Brown Boveri Review Nos. ½-1975, pp. 65-67 under the title "High-Frequency Tube-Welding Using High-Power Generators". In both instances, a tube-type oscillator is used for achieving power and frequency levels. The present invention relies on inverter circuit techniques and the use of power FET devices to achieve higher goals, namely, the radio frequency range and powers of the order of 10 Kilowatts, or more.

SUMMARY OF THE INVENTION

It is proposed with the present invention to use power MOSFET devices as the main power switches of an inverter and to control these devices at radio frequency rate in order to generate the AC power required of an induction heating installation. The solid state radio frequency high power generator according to the present invention comprises: a voltage-fed inverter circuit having power MOSFET devices outputting radio frequency current between two output terminals onto a series combination of a load capacitor and a load inductance coil connected to the output terminals, the load inductance coil being inductively coupled with a workpiece to be treated by induction heating, and the series combination being resonantly energized.

A symmetrical multi-bus arrangement distributes and carries the high frequency and the high currents in close parallel and opposite current paths, while the power MOSFET devices are also arranged symmetrically and parallel to the multi-bus arrangement, thereby to minimize stray fluxes, inductances and wiring.

Control of operation is insured by a current feedback loop operative to maintain current by varying the switching frequency of the power devices in the inverter. Nonetheless, in order to avoid losing control when the system is too lightly loaded for the current setting, phase shift detection is used to detect zero phase shift between outputted voltage and outputted current and to immediately satisfy the current referencem, thereby to prevent the outputted current from leading the outputted voltage.

DESCRIPTION OF THE PREFERRED EMBODIMENT

Figure 1:
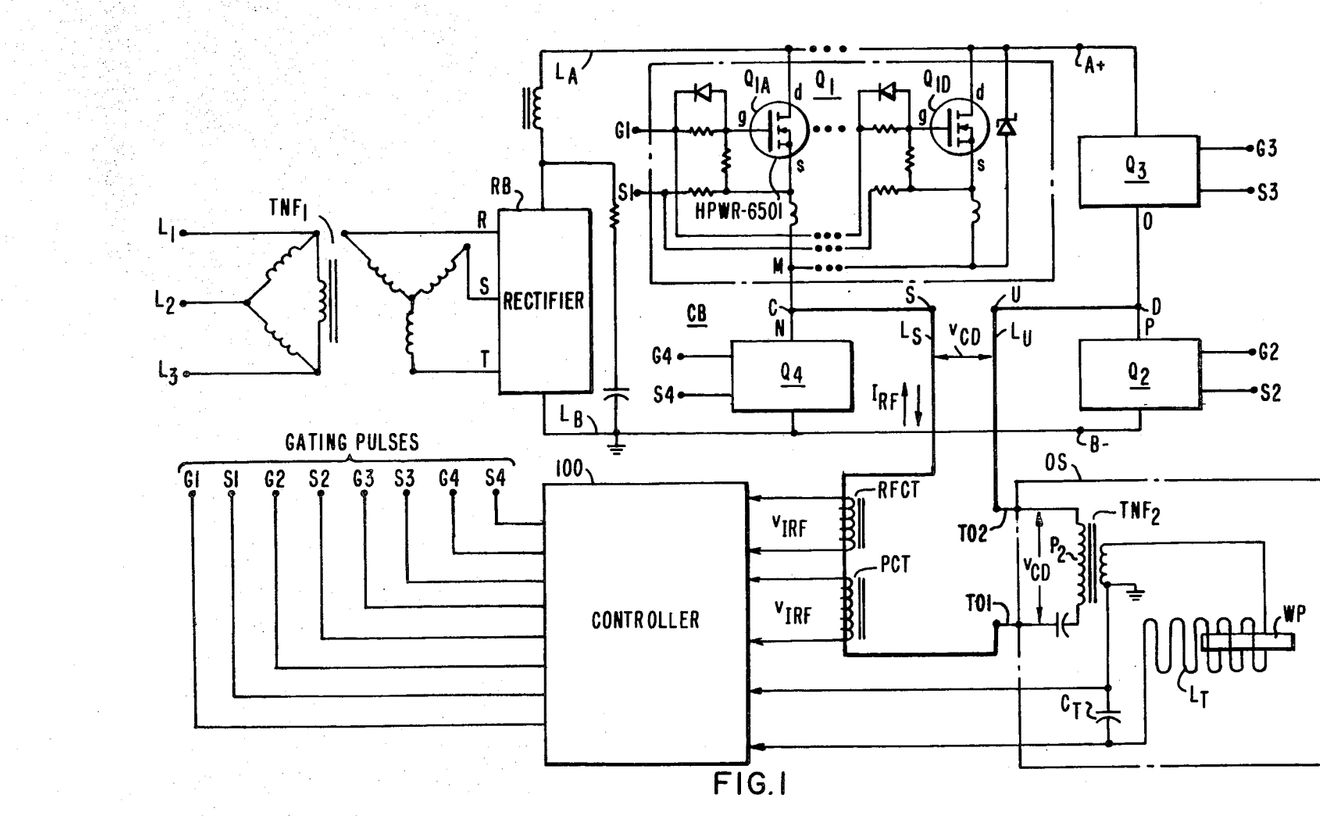
FIG. 1 is an overall diagram representing the solid state high frequency high power generator according to the present invention.

Referring to FIG. 1, the radio frequency generator according to the present invention is shown as part of an induction heating installation supplied from lines L1, L2, L3 of the 240 volts, three-phase, 60 Hz power supply and operating on a workpiece (WP) treated in an output station OS.

Delta-Y connected transformer TNF1 converts the AC power supply from lines L1, L2, L3 into a supply of suitable voltage (for example, 188 volts) having phases R,S,T which are converted by a rectifier bridge RB (rectifier devices RT) into a DC voltage (for instance 250 volt DC) outputted between positive terminal LA and negative terminal LB. Terminals LA, LB lead to an A+ and a B− pole between which a symmetrical four-leg inverter bridge CB is inserted including at least one power MOSFET device ($Q_1$, $Q_2$, $Q_3$ or $Q_4$) on each leg. It is understood that other power switch arrangements can be used for power conversion, for instance, a half-bridge using only two power MOSFET in the center-tapped power supply. As illustrated in FIG. 1, four (in this particular instance for illustration only) such power devices are provided in each leg, mainly $Q_{1A}$-$Q_{1D}$ for $Q_1$; $Q_{2A}$-$Q_{2D}$ for $Q_2$; $Q_{3A}$-$Q_{3D}$ for $Q_3$ and $Q_{4A}$-$Q_{4D}$ for $Q_4$. The number of such devices actually in use and symmetrically disposed in the inverter bridge CB may be chosen, and selected in accordance with the desired power output and as suitable for the particular workpiece treatment requirements. For the sake of simplicity, symbols $Q_1$, $Q_2$, $Q_3$ and $Q_4$ will be used hereinafter in order to designate collectively the operative power MOSFET device, or devices, actually used in a given situation with converter CB. Typically, $Q_1$ and $Q_3$, being in this instance of the N-channel type, have their drain electrode d connected to positive pole A, while $Q_4$ and $Q_2$ have their source electrode s connected to negative pole B. The output of the converter is between junction points C and D, where the source electrode s of $Q_1$ and the drain electrode d of $Q_4$ are common with junction D, while the source electrode s of $Q_3$ and the drain electrode d of $Q_2$ are common with junction D.

In operation, devices $Q_1$-$Q_4$ are gated, via lines $G_1$-$G_4$, by pairs so that power is derived from terminals LA, LB, alternately through $Q_1$ and $Q_2$ from C and via the load to D, or via $Q_3$ and $Q_4$ from D via the load to C.

As well known, a power MOSFET device comprises a drain electrode d, a source electrode s, and a gating electrode g. Whenever a positive gating pulse is applied on gate g, current is allowed to flow from d to s if the device is of the N-channel type, in the opposite direction from source s to drain d with negative gating pulse, if it is of the P-channel type. Power MOSFET devices are known and sold on the open market under various trade names such as "VMOS", "HEXFET", "DMOS" or merely "Power FET's", depending upon the particular manufacturer, which may be International Rectifier, Motorola, Hewlett-Packard, Siliconix, etc. These devices have the advantage of being able to carry a high current and exhibit an unusually fast rise and decay capability. Therefore, when properly gated, power FET devices can be turned ON and OFF at rates of the order of 10 to 100 nanoseconds. By comparison, conventional transistors can only be switched at rates up to 200 kHz, and thyristors hardly ever exceed 10 kHz, even with the assistance of modern GTO gating techniques.

From output junction points C and D, converter CB is connected to output terminals TO1, TO2 of the output station OS by cables $L_S$, $L_u$, which are connected to the opposite ends of the primary P2 of a transformer TNF2, the secondary of which is closed through a resonant circuit comprising a capacitor $C_T$ and an inductance $L_T$ which is the heating coil for the workpiece WP as it is conventional when generating an active high frequency field for induction heating treatment of a workpiece.

From a general consideration of the high power high frequency generator just described, it appears that careful attention should be addressed to:

(1) the manner in which the power FET devices of converter CB are controlled for a workable and reliable induction heating installation;
(2) the design of the circuitry in order to cope with the stresses, losses and inductances due to the very high frequency of operation and the high power involved.

Controller 100 (shown with more details in FIG. 3) generates gating pulses of appropriate amplitude and shape and provides the required timing and frequency of occurrence over gating channels (G1, S1) (G2, S2), (G3, S3) and (G4, S4) to the four legs involving $Q_1$, $Q_2$, $Q_3$ and $Q_4$ in the converter. Such control is in response to selected operating parameters, especially in regard to a detected operative condition at two locations in the circuit, namely:

(1) the outputted RF current sensed along one of the outputted leads ($L_S$) and
(2) the induction heating load taken across capacitor CT in the external output tank OS.

How these parameters are handled by the controller 100 will be explained hereinafter by reference to FIG. 3.

Figure 2:
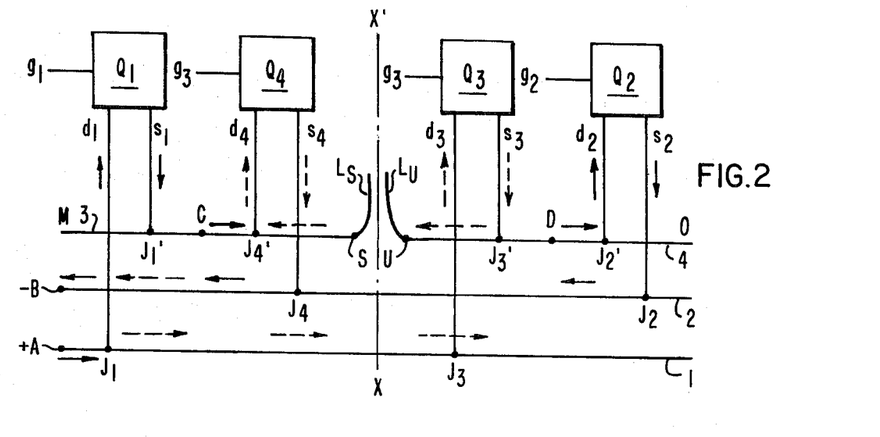
FIG. 2 is a collector bus system particularly applicable to an R.F. high power generator such as illustrated in FIG. 1.

Referring to FIG. 2, the design of the output leads of converter CB connecting junction points C and D to negative terminals TO1, TO2 will now be described with particularity, since such design is essential for a proper operation of converter CB in the intended radio frequency range, typically from 100 kHz to 500 kHz. In view of the high power achieved and the high frequency developed between output leads $L_S$ and $L_U$, leads are provided in which the current paths are parallel, in opposite directions and in close relationship to minimize flux effect and inductances. As shown in FIG. 1, when power devices Q1 and Q2 are gated for conduction, current flows from DC pole A and DC lead $L_A$ via $Q_1$ and a path defined by M, C, S, $L_S$, the resonant circuit load ($C_T$, $L_T$), $L_U$, U, D, P and onto DC lead $L_B$ and the negative polarity pole B across Q2. In the opposite direction, e.g. on a subsequent alternance, power devices Q3 and Q4 are controlled for conduction by controller 100 so that current now flows from positive pole A, DC lead $L_A$ through Q3 along a path defined by O, D, U, $L_U$, the resonant circuit ($C_T$, $L_T$), $L_S$, S, C, N and, via Q4, onto the DC lead LB for the negative polarity pole B.

As illustrated by FIG. 2, a collector bus system of low inductance is provided to distribute the current paths for both directions of commutation. Two coextensive main busses of opposite polarities, 1 and 2, are disposed in close parallel relationship to carry current from terminal LA to junction points J1 (to Q1), J3 (to Q3) on bus 1 and to terminal LB from junction points J4 (from Q4) and J2 (from Q2). In the same fashion, the output leads $L_S$, $L_U$, are connected to the respective ends S and U of two busses (3 and 4, respectively) which are parallel to busses 1 and 2 and are also in close proximity thereto. Busses 3 and 4 are substantially half the length of busses 1 and 2 and are aligned to one another in their parallelism to busses 1 and 2. The overall organization of the pairs of power devices ($Q_1$, $Q_4$) and ($Q_3$, $Q_2$), and the four busses, admits of a symmetry about a vertical plane XX'. Thus, the inner and opposte ends S and U of busses 3 and 4 and the outer ends M and O are both symmetrically spaced from one another. In the same fashion the outer power devices ($Q_1$, $Q_2$), and also the inner power devices ($Q_4$, $Q_3$), are equally spaced. Moreover, the overall organization admits of a certain parallelism between busses and between the power devices and the busses. As shown in FIG. 2 by the arrows, in solid line for one alternance ($Q_1$, $Q_2$) of conduction, in dotted line for the opposite alternance ($Q_4$, $Q_3$), the current paths are parallel and opposite from one bus to another. The busses are closely related in fact. The spacing of the busses has been quite exaggerated in FIG. 2 for the purpose of clarity, and so are the distances between the drain and source electrodes (d$_1$, s$_1$), . . . (d$_4$, s$_4$) of the MOSFET devices Q$_1$–Q$_4$. The busses preferably consist of flat conductors properly insulated from one another. Leads L$_S$ and L$_U$ to the load (C$_T$, L$_T$) are high frequency cables comprised of two pairs of Litz wire cables arranged in a similar polarity and opposite disposition.

Figure 3:
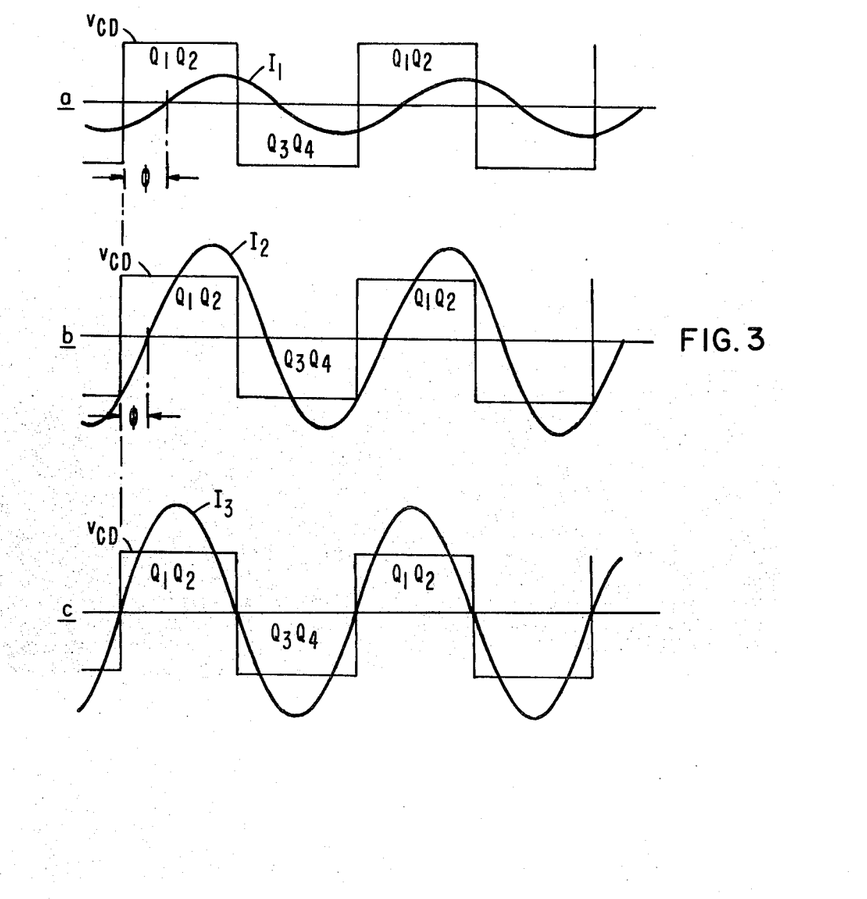
FIG. 3 illustrates with curves the voltage and the current outputted by the generator of FIG. 1 for zero, partial and total power conversion when the workpiece causes the system to be out of, partially in, or totally in, resonance.

FIG. 3 illustrates with curves for the same load (WP): zero [curves (a)], partial [curves (b)] and total [curves (c)] power conversion into the output station OS for a given tuning frequency defined by the serially connected C$_T$, L$_T$ of the load circuit in the tank. For a given workpiece WP and a given position thereof in relation to the heating coil L$_T$, resonant circuit C$_T$, L$_T$ has a particular natural frequency f$_o$, which therefore will not be necessarily the natural frequency of the series combination C$_T$, L$_T$ of a capacitor and a load inductance, in the presence of any workpiece WP. Controller 100 will be explained hereinafter in terms of its internal organization so that the output station OS can be automatically adjusted and controlled for maximum efficiency, e.g. for operation at the R.F. current output desirable for the workpiece WP in treatment. v$_{CD}$ is the voltage between L$_A$ and L$_B$, applied by the inverter CB, alternatively in opposite directions between points S and U, or lead lines L$_S$ and L$_U$ (FIG. 1). FIG. 3 relates to three different frequencies of operation for a given workpiece WP. Curve (a) for a frequency f$_1$ shows current I$_1$ flowing through the bus lines of FIG. 2 through leads L$_S$ and L$_U$, with a phase shift $\phi$ lagging the voltage curve v$_{CD}$. Curve (b) shows a larger current I$_2$ for less phase shift and a frequency f$_2$ smaller than f$_1$. Curve (c) shows maximum current I$_3$ for zero phase shift and a frequency f$_3$, still smaller than f$_2$, which is the resonant frequency, e.g. for the matched load. More generally, when a workpiece of a given metal, given dimensions and in a particular position relative to coil L$_T$ is installed in the output station OS, a certain frequency is desirable with a sufficient minimum power for effective heat treatment. Under such given parameters, current is adjusted through a feedback loop, so that while current is being increased, the frequency decreases, and conversely.

Figure 4A:
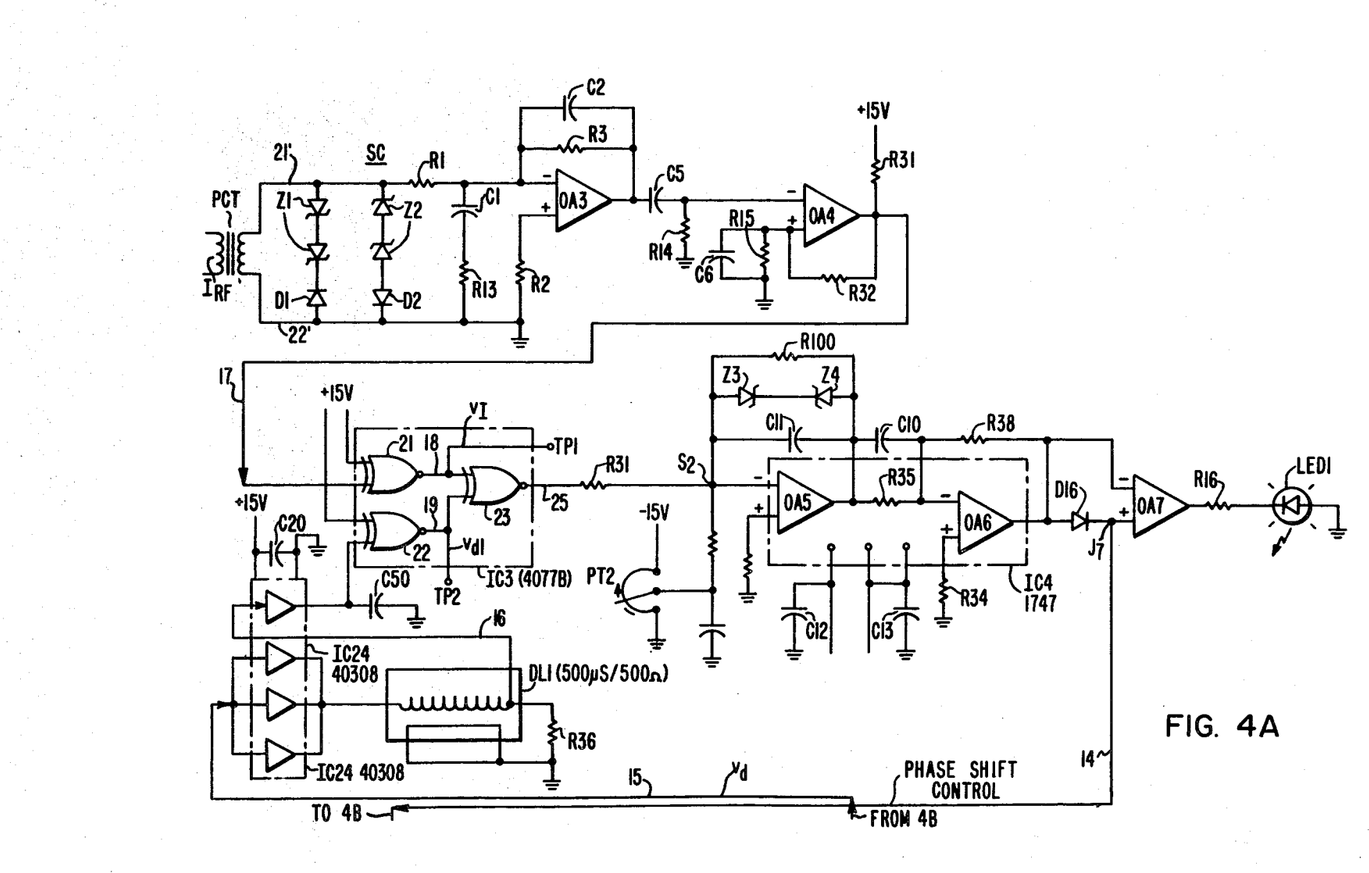
FIGS. 4A and 4B show the detailed circuitry of the controller used for gating the power MOSFET devices of a generator line in the circuit of FIG. 1.
Figure 4B:
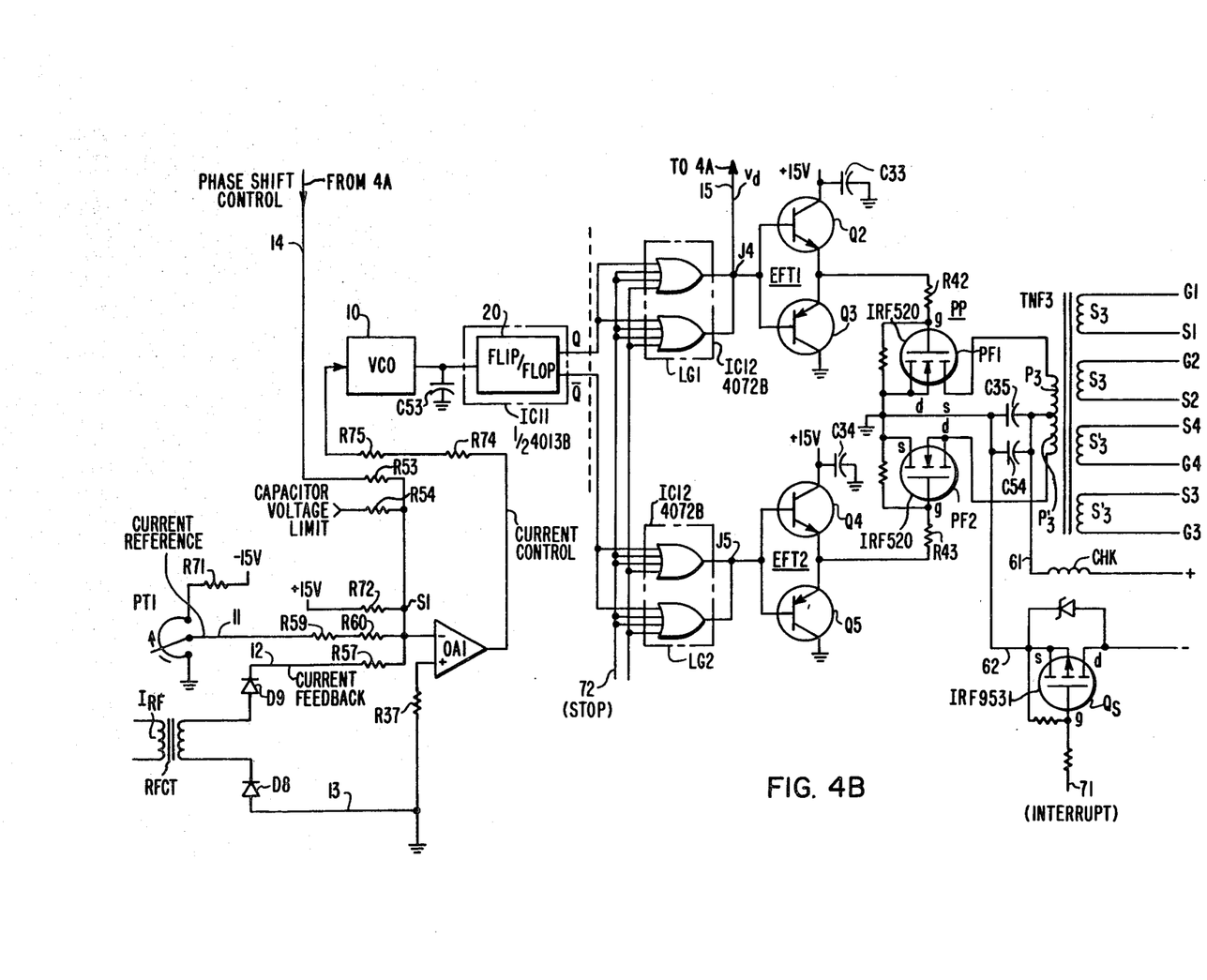

Referring to FIG. 4B, transformer TNF3 is a driver transformer generating at its output between the gate electrode g and the source electrode s of the respective power FET devices Q1, Q2, Q3, Q4, the required gating pulses, in pairs, first to Q1 and Q2 concurrently for one alternance of converter CB, secondly to Q3 and Q4 for the other alternance. Transformer TNF3 thus includes four secondary windings (S$_3$, S'$_3$) operating in pairs, and two primary windings (P$_3$, P'$_3$) having a central tap common to both. Secondaries S$_3$ connect electrodes g and s in one direction (g$_1$, s$_1$ and g$_2$, s$_2$ for Q1 and Q2) while secondaries S'$_3$ connect electrodes g and s in the opposite direction (g$_4$, s$_4$ and g$_3$, s$_3$ for Q4 and Q3). When P$_3$ is energized, only secondaries S$_3$ are effective thereby to gate Q1 and Q2, whereas when P'$_3$ is energized (in a direction opposite to the way P$_3$ was energized) only S'$_3$ are effective, thereby to gate Q4 and Q3. A push-pull combination of two power MOSFET devices PF$_1$, PF$_2$, each having its drain electrode d connected to one end of the primary (P$_3$, P'$_3$) in transformer TNF3 and its source electrodes s to ground, causes a heavy pulse of current to pass through the associated winding P$_3$, or P'$_3$, when the device (PF1, or PF2) is turned ON by its gate electrode. At the same time, the other device (PF2, or PF1) is turned OFF and the corresponding winding P$_3$, or P'$_3$, is kept open.

Gating of PF1, PF2 is provided by emitter follower transistor pairs EFT1, EFT2 mounted each between a +15 V potential source and ground. Each pair (EFT1, or EFT2) is logically controlled on the two base electrodes thereof from a junction point J4 for EFT1, J5 for EFT2. A logic circuit LG$_1$ establishes at J4 the ON status for EFT1, PF1, P3 and (Q1, Q2), while a logic circuit LG$_2$ establishes at J5 the ON status for EFT2, PF2, P'$_3$ and (Q4, Q3). The alternance between ON and OFF status at J4 and J5 establishes the frequency of commutation between Q1, Q2 and Q4, Q3, e.g. between junction points C and D (FIG. 1).

Referring to FIG. 4B, the frequency of operation is established by a reference voltage signal derived from potentiometer PT1 between a −15 V potential source and ground. The reference voltage on line 11 is compared at summing point S$_1$ (connected to the inverting input of operational amplifier OA$_1$), with a feedback signal derived on line 12, which is a current output (I$_{RF}$) representative signal as sensed by measuring transformer RFCT (see FIG. 1) on output cable LS.

Considering the current feedback loop of FIG. 4B just described, it is observed that the slow reverse recovery characteristic of the MOSFET built-in commutating diodes in the voltage fed inverter CB requires that the power device always works with lagging current. This means that the driver frequency of the inverter which times the output voltage, must be always larger than the natural frequency f$_o$ of the series-tuned load circuit (C$_T$, L$_T$). With this understanding, whenever the feedback current signal on line 12 does not match the reference signal of line 11 at the input of operational amplifier OA1, the control signal at the output of OA1 will cause the VCO to decrease its frequency thereby to raise the current feedback signal of line 12 until the match is achieved. Thus, in general an operating frequency will be achieved in a given situation which will be somewhere above the natural frequency f$_o$, or possibly at the very frequency f$_o$.

The latter situation, however, would be a limit situation, since as earlier stated, leading current operation is to be avoided with an MOSFET device.

Still, it is possible that given a certain working condition, namely with a too light load, or given an excessive adjustment of the potentiometer PT1, the decrease of frequency by the VCO to respond to the size of the error between the feedback current of line 12 and the reference signal of line 11 would tend to bring down the frequency beyond the natural frequency f$_o$. In order to avoid this undesirable possibility, a phase shift loop shown in FIG. 4A is provided which will detect the occurrence of a zero phase shift between output current and output voltage, e.g. characterizing operation at the natural frequency. As a result of such detection, an overriding signal is generated and applied via line 14 to summing point S$_1$ to inhibit any further frequency control by the current loop on the VCO.

Figure 5:
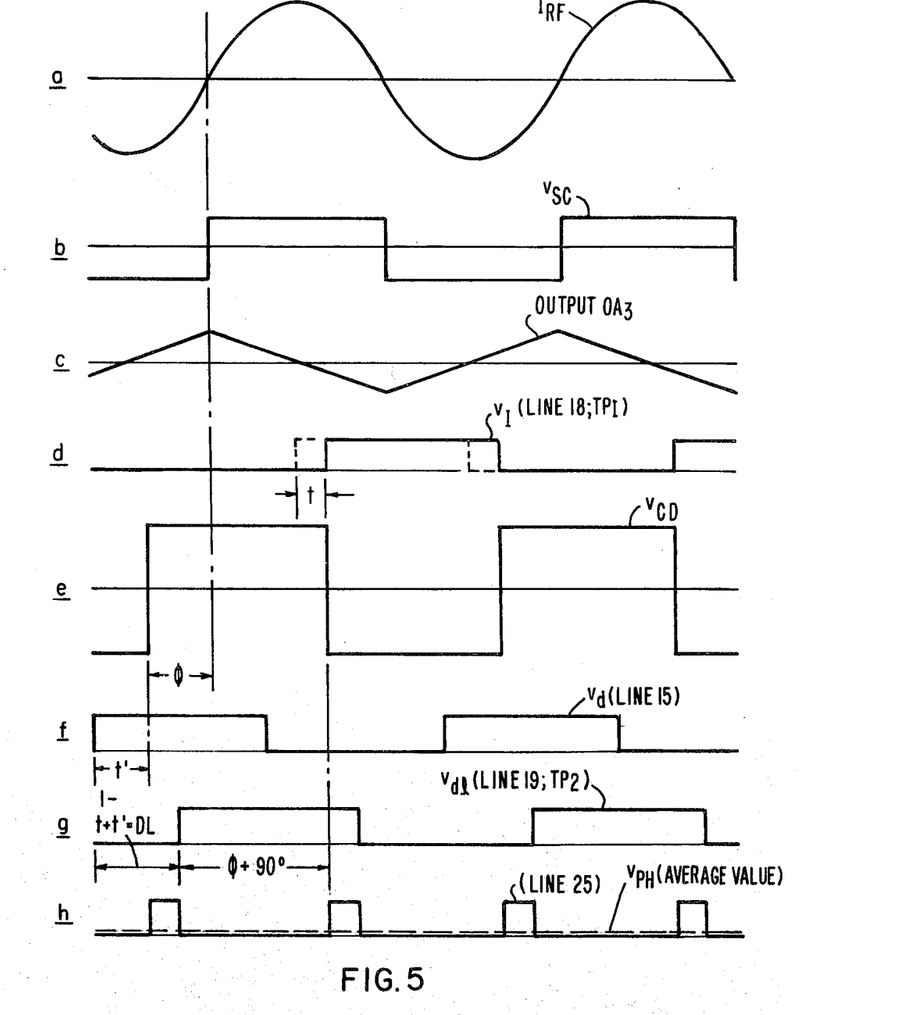
FIG. 5 illustrates with curves the phase shift detection method and technique used to make control of the generator of FIGS. 1 and 4 stable, reliable and independent of frequency.

First, the output RF current I$_{RF}$ is sensed on cable L$_S$ by a second measuring transformer PCT (see FIG. 1) and the sinusoidal signal (curve (a) of FIG. 5) is squared by a conventional circuit SC comprising two opposite serial networks including zener diodes mounted across glead lines 21', 22'. The clipper signal v$_{SC}$ (see curve (b) of FIG. 5) is then shifted by 90° through an integrating operational amplifier OA$_3$ for a purpose explained hereinafter by reference to FIG. 6. The output of OA$_3$ is a see-saw-like signal (see curve (c) of FIG. 5). The signal from OA3 is passed through a coupling capacitor C5 and fed into another operational amplifier OA4 in the form of a digital comparator which converts the ramp-like signal into a digital signal $v_I$ (line 17) which exhibits a delay $\tau$ in the transformation process. $\tau$, typically, is in the order of 200 nanoseconds.

Secondly, a digital signal $v_d$ representative of the output voltage $v_{CD}$ (see curve (e) on FIG. 5) is derived by line 15 from junction J4 at the output of logic circuit LG$_1$. Since the status of J4 determines the switching of the power MOSFET devices by the driver transformer TNF3, there is a lag in the outputted voltage $v_{CD}$ relative to the controlling signal $v_d$ (see curve (f)). The time delay is $\tau'$. It is also of the order of 200 nanoseconds. It is observed that between the outputted voltage $v_{CD}$ and the outputted current $I_{RF}$ from the inverter, there is a phase shift $\phi$ which is to be detected. The phase shift $\phi$ between $v_{CD}$ and $I_{RF}$ is not the same as the phase shift between digital signals $v_I$ (line 18) derived after an inserted Exclusive-NOR device 21) and $v_d$ (line 19) derived afer an Exclusive-Nor device 22, because of the inherent time delays $\tau$ and $\tau'$ in the transmission. In accordance with the present invention, the effects of these two time delays are eliminated from the measurement by introducing a delay line DL$_1$ between line 15 from junction J4 and line 16 to Exclusive-NOR device 22. This delay line will be adjusted after an initial testing operation between testing points TP$_1$ from line 18 (for signal $v_I$) and TP$_2$ from line 19 (for the delayed signal $v_d$ on line 16 after the delay line DL$_1$). With an oscilloscope, or otherwise, the inherent delay $\tau$ existing between $v_I$ and $I_{RF}$ is measured at testing point TP$_1$, while in the same manner $\tau'$ existing between $v_d$ and $v_{CD}$ is measured. Then, the delay line DL$_1$ is adjusted so that a delay $t_{DL} = \tau + \tau'$ is imparted to $v_d$ (see curve (g) and signal $v_{d1}$ on FIG. 5). As a result of such correction, a phase shift comparison becomes possible between the delayed signal $v_{d1}$ and the non-delayed other digital signal $v_I$, which will represent $\phi$ at all times independently of the frequency of operation. This is accomplished by Exclusive-NOR device 23 which outputs on line 25 the signal $v_{PH}$ shown by curve (h) of FIG. 5. This signal is applied to summer point S$_2$ where a potentiometer PT$_2$ establishes a reference, at the input of an operational amplifier OA$_5$ mounted as an integrator and providing (after inversion by another operational amplifier OA$_6$) at junction J$_6$ the average signal $v_{PH}$ of curve (h). Potentiometer PT$_2$ is adjusted so that a change of state at junction J$_6$ occurs whenever the phase shift $\phi$ passes exactly through zero.

Referring to FIG. 5, curve (a) is the signal representative of the output current $I_{RF}$. It appears as a voltage after transformer PCT$_1$ between lines 21', 22' (FIG. 4A). Curve (b) is the signal $v_{SC}$ at the output of the squaring circuit SC. It is inputted into operational amplifier OA3. The integrator introduces a 90° phase shift as shown by ramp curve (c). Digital comparator OA4 generates a digital signal $v_I$ shown by curve (d). The inherent time delay $\tau$ indicates that $v_I$ lags what it should have been by $\tau$. This signal is passed into Exclusive-NOR device 21. Curve (d) is typical of the signal on line 17 at the output of OA4, or on line 18 at the output of device 21. Curve (e) of FIG. 5, is a signal $v_{CD}$ representative of the output voltage between terminal points C and D at the output of the inverter, which is also the RF voltage between the load terminals in the output station OS. $v_{CD}$ leads the output current $I_{RF}$ by a phase shift $\phi$. The outputted voltage is generated so as to be in accordance with the change of state of the driver. Therefore, $V_d$ of line 15 derived from J4 is representative of $v_{CD}$, however, with an inherent lead time $\tau'$, as shown on curve (f). Delay line DL1 introduces a time delay $\tau + \tau'$, whereby signal $v_{d1}$ of line 16 is $(\tau + \tau')$ lagging $v_d$, as shown by curve (g). Signal $v_{d1}$ is passed through an Exclusive-NOR device 22, so that the signals of line 16 at the output of device 22 and of line 19 at the output of device 22 are typically shown by curve (g) of FIG. 5.

Phase detector 23 compares signals $v_{d1}$ and $v_I$. In fact, the phase shift existing between the delayed signal $v_{d1}$ and signal $v_I$ is $(\phi + 90°)$ owing to the 90° phase shift introduced by OA3. Nevertheless, the phase shift between digital signals $v_{d1}$ and $v_I$ is representative of the phase angle $\phi$ between $v_{DC}$ and $I_{RF}$ independently of frequency. Phase detector 23 is an Exclusive-NOR device and its logic output is shown by curve (h). The measurement bears upon the average value $v_{ph}$ which is the signal derived at the output on line 25.

With regard to curve (h), it is well known that the output C of an exclusive NOR device such as 23, when the inputs are A=$v_I$ and B=$v_{d1}$, is according to the following table of truth:

| C | A | B |
|---|---|---|
| 1 | 0 | 0 |
| 0 | 1 | 0 |
| 0 | 0 | 1 |
| 1 | 1 | 1 |

Curve (h) shows the actual logic combination of curves (d) and (g), which appears on line 25 as an average value $v_{ph}$.

Figure 6:
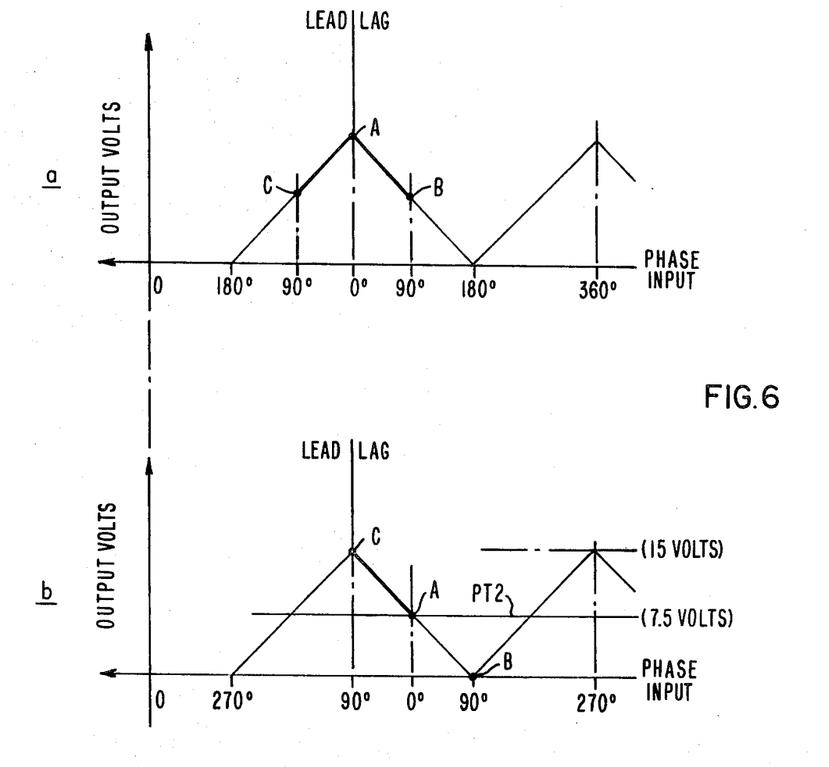
FIG. 6 shows with phase shift characteristics how zero phase shift detection has been made practical in the light of the illustrating curves of FIG. 5.

Referring to FIG. 6, the phase characteristic of the phase detector 23 is shown first by curve (a) if there is no phase shift of 90° introduced by operational amplifier OA3, secondly by curve (b) in the actual situation of FIG. 5, e.g. with the 90° phase shift. A comparison of curves (a) and (b) of FIG. 6, illustrates the importance of operational amplifier OA3.

Curve (a) of FIG. 6 shows that the useful domain of operation, namely for lagging electrical angles (0° to 90°) is AB. This segment at one end is on the peak of the triangle defining operation from 180° lagging (to the right) to 180° leading (to the left) and the peak has about a zero degree phase shift. If the corrective loop rests upon a corrective output generated when point A would be exceeded, it appears that, in the instance of curve (a) when going beyond A, the output of the phase detector would decrease instead of increasing, thereby preventing corrective action. In order to create a useful corrective zone beyond point A, the $v_I$ signal has been shifted by 90° by OA3, and the phase characteristic of the phase detector 23 has become as shown by curve (b) of FIG. 6. The triangle now spans a range in electrical angles from 90° lagging to 270° leading about an operative point C on the peak corresponding to 90° leading. Now, the useful range AB extends straight beyond 0° up to 90° at the peak of the triangle. Potentiometer PT2 is summed with the output of the phase detector on line 25, and PT2 is adjusted so that the critical level matches point A of curve (b) e.g. a phase shift of zero degree. Whenever control under the current loop of FIG. 4B causes the current to tend to lead, the threshold defined by PT2 (FIG. 4A) is exceeded and corrective action exists according to the operative point on AC.

Referring to FIG. 4A, an operational amplifier OA5 which is a differential integrator, responds to the difference between the output signal on line 25 and PT2 as just defined. Operational amplifier OA5 is followed by an inverting operational amplifier OA6 (unity gain). The output of OA6 is inputted into a diode D6 going to junction J7 and from there via lines 14 to the summing point $S_1$ at the input of operational amplifier OA, (FIG. 4B).

It appears that, as long as the voltages established at $S_2$ (inverting input $OA_5$) by PT2 is larger than the voltage on line 25, namely for electric angles lagging, e.g. larger than zero degree, the Zener diodes in the differential integrator OA5 are fully saturated and the output voltage of OA5 is positive. Then, the output of inverter OA6 is negative and diode $D_{16}$ is reverse biased. No corrective action appears from line 14. If, however, the voltage on line 25 exceeds, the voltage established at $S_2$ by PT2, then, the differential integrator OA5 has a negative output, OA6 a positive output and diode D16 becomes forward biased. At this time a signal on line 14 is applied at junction point $S_1$ which compensates for the reference signal established by potentiometer $PT_1$ on line 11, the operational amplifier $OA_1$ no longer responds to an error which would have brought current $I_{RF}$ to lead the voltage $v_{DC}$.

Referring to FIG. 5, the two push-pull devices PF1, PF2 (which are MOSFET devices sold on the market as IRF520 and of the P-channel type) are supplied with power from a 20 volts DC source via lines M1 (positive side) and M2 (negative side). It is important, when stopping the operation of the push-pull PP (namely, while $PF_1$ and $PF_2$ are being alternately controlled for conduction in accordance with the opposite logic states of junction points $J_4$, $J_5$ via emitter follower transistor pairs $EFT_1$, $EFT_2$), not to simply stop gating ON and OFF the two devices PF1, PF2. The reason is that turning OFF $PF_1$ and $PF_2$ at the same time would open the primary of transformer TNF3. First, the exciting current in the primary half ($P_3$ or $P'_3$ depending upon which of $PF_1$ and $PF_2$ was last ON) of the center tapped transformer, will continue to flow and generate an undesirable gating condition at the secondary side of TNF3 which would keep ON the main MOSFET power devices $Q_1$–$Q_4$. Secondly, when the open condition finally exists, a transient voltage will cause current to flow from the drain to the gate which, being unable to flow in the open transformer, will create a gating voltage that might turn the MOSFET of the push-pull back ON. In order to avoid this, both devices $PF_1$, $PF_2$ are turned ON at the same time, rather than having them both OFF. This will provide a decaying path for the primary winding without building the undesired gating voltage at the secondary. Any voltage build-up would flow back to transformer TNF3 insuring a definite turning OFF of the main MOSFET power devices $Q_1$–$Q_4$.

It is equally important to disconnect the power supply to the push pull MOSFET devices $PF_1$, $PF_2$ when turning them both ON. This should occur simultaneously, or nearly so. Therefore, another MOSFET device $Q_S$ is used as shown in FIG. 5, in the negative lead $M_2$ from the source to the middle ground connection of the push-pull. The device $Q_S$ is chosen to be of the P-channel type. Then, current flows from source to drain relative to ground so that the gating line 71 for OFF/ON logic be applied under minimum voltage with a faster response. The START/STOP command is applied by line 72 to both logic circuits $LG_1$, $LG_2$, e.g. to the OR devices included therein. When line 72 applies a ONE to both sides of the flip-flop controlled logic circuits, the logic states of $J_4$ and $J_5$ will cause both devices $PF_1$ and $PF_2$ to be turned ON, while by line 71 the interrupter $Q_S$ is concurrently turned OFF. When the heat treatment is to be resumed, for instance, after changing the workpiece WP in the output station OS, the operator presses the START button, and via line 71 the power supply to $PF_1$, $PF_2$ is turned ON, while the ZERO logic on the OR devices of $LG_1$ and $LG_2$ will allow the flip flop FF to control the alternances of $LG_1$, $LG_2$, e.g. of $J_4$, $J_5$, or $PF_1$ and $PF_2$. A choke CHK is provided on line $M_1$ of the power supply of $PF_1$, $PF_2$ in order to insure concurrence in the effects from control by lines 71 and 72.

We claim:
1. In an induction heating system including:
a static controlled variable frequency voltage-fed inverter generating an output current and a square-wave output voltage; having static controlled power devices switched at a selected operating frequency; a resonant series combination of a load capacitor, a load inductor coil and a workpiece inductively coupled for treatment by said load inductor coil; said series combination being energized by said inverter output voltage and output current at said operating frequency; the combination of:
power MOSFET devices as said power devices;
said operating frequency being in the radio frequency (RF) range;
said output current normally lagging said output voltage with a phase shift;
feedback means responsive to said output current and to a current reference signal for applying a control signal for controlling said power MOSFET devices for modifying said operating frequency to provide an output current in relation to said reference signal; and
limiter means responsive to the occurrence of a zero phase shift between said output voltage and said output current for generating an overriding signal applied to said feedback means for limiting current control, thereby to prevent said output current from leading said output voltage.
2. The system of claim 1 with said limiter means including:
first means for providing a first digital signal representative of said output current;
second means for providing a second digital signal representative of said output voltage;
third means responsive to said first and second digital signals for providing said overriding signal when said zero-phase shift occurs; with said power MOSFET devices being digitally controlled by said feedback means from one of an ON and an OFF status to the other at (R.F.) radio frequency;
said second digital signal being derived in accordance with said ON and OFF status of the power MOSFET devices; and
said first digital signal being derived in accordance with said output current; with said first digital signal lagging said output current by a first time interval;
with said second digital signal leading said output voltage of a second time interval;

means being provided for delaying said second digital signal by an amount equal to the algebraic sum of said first and second time intervals to provide a third digital signal substituted for said second digital signal at the input of said third means, whereby the phase shift between said first and third digital signal is representative of the phase shift between said output current and output voltage independently of the operating frequency.

3. The system of claim 2 with said third means including:
phase detector means responsive to said first and third digital signal for providing an actual phase signal;
a threshold signal indicative of zero-phase shift;
means responsive to said actual signal exceeding said threshold signal for deriving a monodirectional error signal;
and means response to said monodirectional error signal for driving said applied signal in relation to the error.

4. The system of claim 3 with one of said first and second digital signals being shifted by 90°, whereby said phase detector exhibits an actual phase signal having a continuous gradient throughout the zero degree phase shift level.

5. The system of claim 4 with said phase detector means including exclusive NOR logic means for outputting said actual phase signal.

6. The system of claim 5 with said monodirectional error signal deriving means including differential integrator means for providing an average value of said actual phase signal by reference to a threshold level defined by said threshold signal.

7. The system of claim 6 with said limiter means including diode means normally operative at a reversed bias when said phase shift is lagging to prevent applying said overriding signal to said feedback means, and operative at a predetermined forward bias level when said phase shift is zero, for passing said overriding signal to said feedback means.

8. The system of claim 7 with said feedback means including:
means responsive to said output current for deriving a signal representative thereof;
operational amplifier means having one input responsive to said representative signal, to said current reference signal and to said applied signal, whereby said applied signal is combined with said current reference signal to satisfy current demand in said feedback means when a zero phase shift is detected by said third means and said steering diode means becomes forward biased.

* * * * *